United States Patent [19] [11] 3,788,384
Ujiie [45] Jan. 29, 1974

[54] APPARATUS FOR CONSTRUCTING SUBSTANTIALLY CIRCULAR CROSS-SECTION VESSEL BY WELDING

[75] Inventor: Akira Ujiie, Kobe, Japan
[73] Assignee: Mitsubishi Jukogyo Kabushiki Kaisha, Tokyo, Japan
[22] Filed: Oct. 18, 1971
[21] Appl. No.: 190,423

Related U.S. Application Data
[62] Division of Ser. No. 5,311, Jan. 23, 1970, Pat. No. 3,665,143.

[52] U.S. Cl............................. 164/252, 164/98
[51] Int. Cl........................................... B22d 27/02
[58] Field of Search.. 219/73, 76, 126; 164/52, 252, 164/85

[56] References Cited
UNITED STATES PATENTS
3,433,926  3/1969  Dick ................... 219/73 X
3,558,846  1/1971  Ujiie .................. 164/52 X
3,139,511  6/1964  Kudelko............... 219/76
2,175,607  10/1939  Kinkead................ 219/76 X FOREIGN PATENTS OR APPLICATIONS
57,162  8/1967  Germany .................. 219/76

Primary Examiner—J. Spencer Overholser
Assistant Examiner—John E. Roethel
Attorney, Agent, or Firm—John J. McGlew et al.

[57] ABSTRACT

A multi-layer, thick wall, substantially circular cross-section metal vessel includes a plurality of concentric tubular layers formed by the progressive deposition of molten weld metal mainly provided by electroslag welding process to form continuous helical strips with the axially adjacent convolutions of each helical strip being contiguous. The several helical strips are formed simultaneously, and each helical strip is solidified in contact with solidified metal. Each strip of molten metal forming a tubular layer of a relatively larger diameter is deposited progressively and progressively solidified onto a tubular layer of smaller diameter with an axial offset corresponding to a predetermined pitch of a helix.

4 Claims, 4 Drawing Figures 3,788,384

APPARATUS FOR CONSTRUCTING SUBSTANTIALLY CIRCULAR CROSS-SECTION VESSEL BY WELDING

This is a division of application Ser. No. 5,311 filed Jan. 23, 1970, now U.S. Pat. No. 3,665,143.

BACKGROUND OF THE INVENTION

Recently constructed vessels, used in various fields of industry, have been designed for use at very high temperatures and very high pressures, and also for greatly increased capacity. This has necessitated that these vessels be constructed with thicker walls, larger diameters and greater lengths.

In order to satisfy these requirements, there has been developed a method by the same inventor wherein a vessel of tubular cross-section or the like is constructed solely from deposited weld metal by successively depositing molten weld metal mainly provided by electroslag welding process to form a continuous helical strip, with the freshly deposited molten weld metal being progressively deposited along, and progressively solidified in contact with already solidified metal. In this known method, a thick-wall vessel, having a seamless wall, can be formed easily and at a relatively low cost. The wall of such a vessel has a greatly decreased amount of non-metallic inclusions and has uniform mechanical properties.

However, as the wall thickness of the vessel increases, the known method may have the disadvantage that blowholes, cracks, distortion, are caused by coarsening of the grain structure, especially at the time of formation of the thicker wall, by weld depositing a great amount of molten weld metal in one continuous step in order to increase deposition rate. Additionally, as a thick wall is deposited and solidified in one continuous step in the direction of the thickness of the wall, it is impossible to make the wall composited with different chemical compositions, having appropriately the properties at each divided thick of the thick wall, in the direction of thickness, to meet the use requirements of the vessels.

SUMMARY OF THE INVENTION

This invention relates to the formation of multi-layer, thick-wall vessels by welding and, more particularly, to a novel method of and apparatus for such formation and which is free of the disadvantages of the prior art methods in the case of promoting efficiency of deposition rate.

More specifically, in the method of the present invention, a composite tubular vessel is formed solely from molten weld metal, by successively depositing molten weld metal to form a continuous helical strip, with the freshly deposited molten weld metal being simultaneously and continuously deposited along, and solidified in contact with, the end convolution of each stepped portion of already solidified metal having a step-wise changing thickness. With the present invention, it is possible to construct a vessel solely from deposited weld metal and free from blowholes, cracks, distortion and coarsening of grain structure.

As molten metal is simultaneously and continuously deposited and solidified in the form of a helix onto the end convolution of each stepped portion of already solidified metal having a step-wise changing thickness, it is possible greatly to narrow the width of the deposited weld bead and the width of the solidifying weld bead, by dividing the vessel into several layers radially thereof. In addition, it is possible to prevent the formation of blowholes to a great extent by decreasing the temperature differences between the external and internal peripheries of the molten weld metal helices. Furthermore, because of the narrow width of the deposition and solidification of molten weld metal, the chemical composition of each deposited weld metal layer is uniformly distributed, its structure is compact and the crystallization direction is stabilized, thus eliminating the formation of cracks and decreasing distortion.

It is also possible to form a vessel having excellent properties by appropriately selecting the composition of the molten weld metal to be deposited along and solidified with the end convolution of each stepped portion of the wall.

Apparatus embodying the invention includes a frame having a basic shape substantially the same as that of an end portion of the tubular body to be formed by depositing molten weld metal, and having an end formed step-wise in the direction of its radial thickness. The apparatus also includes a driving means to rotate the frame about its axis, and a slidable strap in contact with the frame or with a metal zone deposited and solidified on the frame. Furthermore, a welding apparatus is included to supply molten weld metal successively to a plurality of recesses formed by the frame, or by a stepped surface of a metal zone, and by the slidable strap. The method of the invention can be performed very easily, reliably and effectively by the apparatus of the invention.

An object of the invention is to provide an improved method of and apparatus for forming a composite tubular metal vessel solely by deposited weld metal.

Another object of the invention is to provide such a method and apparatus adapted to form the vessel as a multi-layer, thick-wall tubular vessel.

A further object of the invention is to provide such a method and apparatus for forming a composite metal vessel by welding and with which the vessel is free of blowholes, cracks, caused by coarsening of the grain structure and distortion.

Another object of the invention is to provide such a method and apparatus in which the weld metal is deposited in the form of a plurality of simultaneously deposited helical beads which are relatively narrow both axially and radially of the vessel.

A further object of the invention is to provide such a method and apparatus in which axially successive convolutions of each helical strip or bead are deposited in axially contiguous relation.

A further object of the invention is to provide such a method and apparatus in which the helical strips or beads have different respective radii with each helical strip or bead being radially contiguous with an adjacent helical strip or bead.

Another object of the invention is to provide such a method and apparatus in which radially adjacent helices are stepped progressively from each other, in a direction axially of the vessel being formed, by the pitch of a helix.

For an understanding of the principles of the invention, reference is made to the following description of a typical embodiment thereof as illustrated in the accompanying drawings.

DESCRIPTION OF THE PREFERRED EMBODIMENT

Figure 1:
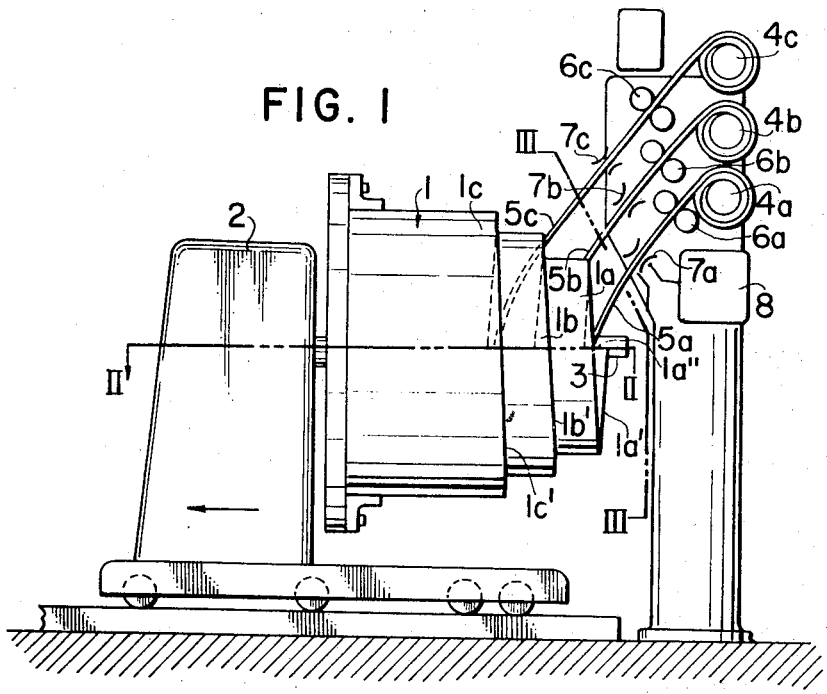
FIG. 1 is a front elevation view of one form of apparatus for constructing a composite vessel, by welding, in accordance with the present invention.
Figure 2:
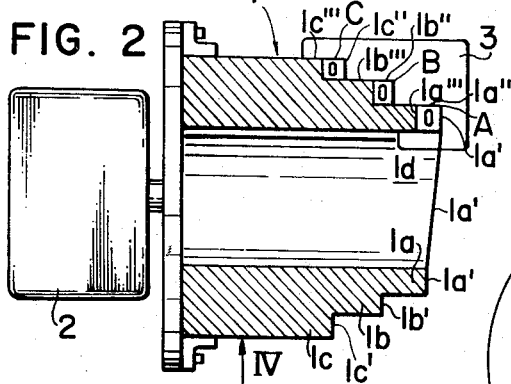
FIG. 2 is a part horizontal plan and part horizontal sectional view taken along the line II—II of FIG. 1.

Referring to the drawings, in the illustrated embodiment of the invention, an electro-slag welding process is used. However, it should be understood that other electric welding processes are equally applicable.

The apparatus of the invention includes a cylindrical starting block 1 whose right end is constituted by an inner or core tube 1a, an intermediate tube 1b and an outer tube 1c. The end surface 1a' of inner or core tube 1a is formed helically, and the ends of the helix adjoin in a radial plane 1a'' with a step offset having a length p in the axial direction, the length p representing the pitch of the helix. The end surface 1b' of the intermediate tube 1b, and the end surface 1c' of the outer tube 1c, also are formed helically, with the ends of each helix abutting, in step formation, at the radial planes 1b'' and 1c'', respectively, each including a stepped offset having the length p in the axial direction.

A carriage 2 supports cylindrical starting block 1 for rotation about a horizontal axis, and serves to retract block 1, in the actual direction, by the helical pitch distance p during each rotation of starting block 1.

A water-cooled copper strap 3 has a stepped edge for close conformance with the helical end surfaces 1a', 1b' and 1c', and with the peripheral surfaces 1a''', 1b''' and 1c''' of the respective tubes 1a, 1b and 1c. Copper strap or block 3 also is formed to engage the inner peripheral surface 1d of starting block 1.

Depressions or recesses A, B and C are formed on the respective peripheral surfaces 1a'', 1b'' and 1c''. Metallic welding materials 5a, 5b and 5c, in the form of wire, rods, or strips, are wound on respective reels 4a, 4b and 4c, and are fed to recesses A, B and C by respective feeding means 6a, 6b and 6c. Reference numeral 8 indicates a power source for a welding transformer which supplies welding current to the metallic weld materials 5a, 5b and 5c to respective electric contact brushes or rollers 7a, 7b and 7c.

The operation of the illustrated apparatus will now be described. When the ends of weld materials 5a, 5b and 5c are inserted into respective recesses A, B and C, a fixed quantity of flux is introduced into these recesses, and power source 8 for a welding transformer is activated, electric current flows between the ends of weld materials 5a, 5b and 5c and the respective peripheral portions 1a'', 1b'' and 1c'' of starting block 1, within the depressions and through the welding flux. The flux is melted to form molten slag, and melting of weld materials 5a, 5b and 5c is initiated.

Figure 3:
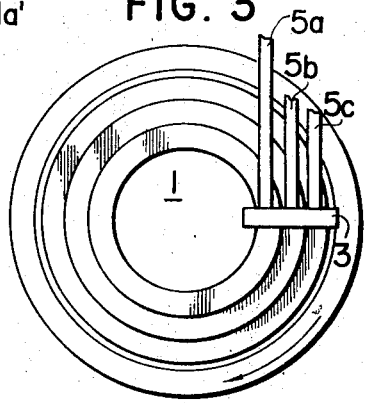
FIG. 3 is an elevation view taken along the line III—III of FIG. 1.
Figure 4:
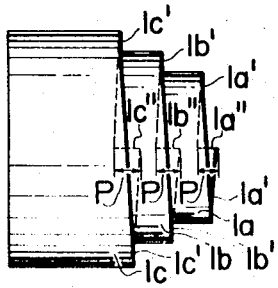
FIG. 4 is a view taken in the direction of the arrow IV of FIG. 2, with a water cooled copper strap being omitted.

When such melting is initiated, starting block 1 is rotated by carriage 2 in the direction of axial descent of the peripheral surfaces 1a'', 1b'' and 1c'' of starting block 1, which is in the clockwise direction as viewed in FIG. 3. Simultaneously, block 1 is retracted axially by a distance equal to the helical pitch p during each complete revolution. During this rotation and retraction of block 1, molten weld metal from the restrictive weld materials 5a, 5b and 5c, within the depressions A, B and C is solidified onto the respective peripheral surfaces 1a'', 1b'' and 1c'' of starting block 1, and deposited progressively on already solidified molten weld metal to form helical strips. Thereby, tubular vessels, which have not been shown, are simultaneously formed at the right hand end of block 1 as illustrated in FIG. 1, and the ends of the formed vessel have the same shape as that of the tip or right hand end of starting block 1.

As mentioned above, a thick-wall tubular vessel is divided into three parts in the radial direction, and thus the radial width of each strip of molten weld metal can be decreased to one third the overall thickness of the vessel. As a result, at the time when the molten weld metal is deposited and solidified, the temperature difference between the outer periphery and the inner periphery of the tubular vessel can be greatly decreased. Therefore, pipe-like blowholes, frequently occurring in the interiors of molten ingots and the like, can be eliminated.

Because of the narrow width of the molten weld metal strips, the chemical compositions and the distribution of the grain structure are uniform, the crystallization direction is stabilized, and there are no welding defects such as cracking and the like. Furthermore, the amount of weld metal deposition from each welding material is decreased to one third, as compared with single-layer welding, and thus distortion proportional to the amount of deposited weld metal is significantly decreased. As the weld materials are solidified at three points simultaneously, tubular vessels can be formed more effectively than in the case of three separate weld deposition operations to form single layers during each deposition, and in succession.

The inner layer, the intermediate layer and the outer layer of the formed vessel, at the inner tube 1a, intermediate tube 1b and outer tube 1c, respectively, of starting block 1, in the extended direction of their axes (not shown), are reheated by the melting heat resulting from the weld material to be solidified after the first revolution. Thereby, the effects of normalizing and tempering, similar to those obtained in the case of heat treatment used in multi-layer welding at welding joints, are present in the present invention method and apparatus. Especially, enhancement of normalizing and tempering effects can be effected in the inner layer and in the intermediate layer of the vessel, due, respectively, to the subsequently deposited intermediate layer and outer layer of the vessel.

By utilizing a corrosion resisting metal for the inner layer weld material 5a, a metal having high strength at a high temperature for the intermediate weld material 5b, and heat-resisting metal for the outer weld material layer 5c, the end product will have a very high corrosion resistance against a corrosive material to be contained in the formed tubular vessel, and can adequately endure high temperatures and high pressures when these are applied to the outer surfaces of these vessels.

For example, in the case of reaction towers used in petroleum refining and whose interior surfaces are exposed to hydrogen at high temperature and high pressure to effect desulpherization, the partial pressure of hydrogen at the wall of the reaction tower is nearly proportionally decreased radially of the wall from the inner surface to the outer surface, and hydrogen tends to escape into the atmosphere. By using appropriate materials having good resistance to corrosion by hydrogen, in a step-wise manner radially of the wall from the inner surface to the outer surface to match the respective partial pressures of hydrogen, the amount of expensive material, having a high resistance to hydrogen corrosion, can be reduced, and thus the manufacturing cost can be substantially reduced.

In the embodiment of the invention selected as an example, the number of layers to be welded is three but, by increasing the number of layers, vessels having a better structure can be obtained as well as vessels having a wall of greater thickness. Also, while welding has been described as performed successively from the innermost layer to the outermost layer, it is possible to perform the welding in a reverse order, that is, from the outermost layer to the innermost layer.

Also, in the exemplary embodiment, the formation of the vessel is performed by rotating the cylindrical starting block 1 about a horizontal axis. It should be understood, however, that it is possible to perform the embodiment of the invention by utilizing the helical pitch $p$ and making the tubular starting block 1 to coincide with the thickness of the helical layers to be deposited and by rotating the starting block 1 about a vertical axis. Finally, while an electro-slag welding process has been described as applicable in practicing the invention, it is equally possible to employ MIG welding, TIG welding, or a submerged arc welding process.

While a specific embodiment of the invention has been shown and described in detail to illustrate the application of the principles of the invention, it will be understood that the invention may be embodied otherwise without departing from such principles.

What is claimed is:

1. Apparatus for forming a composite metal vessel solely of deposited weld metal mainly provided by electroslag welding process comprising, in combination, an essentially cylindrical starting frame having, adjacent one end, plural cylindrical surfaces having different respective radii and being stepped relative to each other radially and axially of said body, the smallest diameter cylindrical surface being nearest said one end of said body; each of said cylindrical surfaces being a helix and the pitches of the helices being substantially equal; opposite ends of each helix terminating in a radial plane of said body at an axially stepped offset; means supporting said body for rotation and for axial displacement; and means operable to feed molten metal substantially simultaneously to each of said helical surfaces while said body is rotated and displaced axially by a distance equal to the pitch of a helix during each complete revolution.

2. Apparatus for forming a composite metal vessel solely of deposited weld metal, as claimed in claim 1, including a cooled metal strap having a formation mating the stepped end of said body and slidably engaged with said body during rotation thereof at the start of the molten metal deposition.

3. Apparatus for forming a composite metal vessel solely of deposited weld metal, as claimed in claim 2, in which each helical surface is formed with a recess at its starting end for receiving granular welding flux.

4. Apparatus for forming a composite metal vessel solely of deposited weld metal, as claimed in claim 1, in which said means for depositing molten metal comprises electric welding apparatus operable to feed welding metal in elongated strip form to each of said helical surfaces while supplying welding current to each of said strip form welding metals to melt the same progressively.

* * * * *